United States Patent [19]
Odenthal

[11] Patent Number: 4,899,091
[45] Date of Patent: Feb. 6, 1990

[54] CATHODE-RAY-TUBE ASTIGMATISM CORRECTION APPARATUS

[75] Inventor: Conrad J. Odenthal, Portland, Oreg.

[73] Assignee: Tektronix, Inc., Beaverton, Oreg.

[21] Appl. No.: 708,602

[22] Filed: Mar. 5, 1985

Related U.S. Application Data

[63] Continuation-in-part of Ser. No. 614,510, May 29, 1984, abandoned.

[51] Int. Cl.⁴ ............... H01J 29/58; H01J 29/50; H01J 29/74
[52] U.S. Cl. .................... 315/382; 313/414; 313/437
[58] Field of Search ............ 315/382, 370, 371, 14, 315/15, ; 313/414, 449, 437

[56] References Cited

U.S. PATENT DOCUMENTS

| | | | |
|---|---|---|---|
| 3,544,836 | 12/1970 | Reisner | 315/382 |
| 3,753,034 | 9/1973 | Spicer | 315/382 |
| 3,919,583 | 11/1975 | Hasker et al. | |
| 3,961,223 | 6/1976 | Ray et al. | 315/371 |
| 4,143,293 | 3/1979 | Hosokoshi et al. | |
| 4,242,613 | 12/1980 | Bambring et al. | |
| 4,249,112 | 2/1981 | McKibben | |
| 4,366,414 | 12/1982 | Hatayama et al. | |
| 4,366,419 | 12/1982 | Barten | |
| 4,374,342 | 2/1983 | Say | |

Primary Examiner—Thomas H. Tarcza
Assistant Examiner—Gregory C. Issing
Attorney, Agent, or Firm—John D. Winkelman; John Smith-Hill

[57] ABSTRACT

Apparatus for correcting astigmatism produced by the electromagnetic deflection yoke of a cathode-ray-tube includes stigmator electrodes provided with elongated slots through which the cathode-ray-tube's electron beam or beams pass. Appropriate correction voltages, stored in digital memory, are applied to the stigmator and focus electrodes for bringing about re-focusing of the electron beam in appropriate axes for restoring a single point focus.

26 Claims, 7 Drawing Sheets

CATHODE-RAY-TUBE ASTIGMATISM CORRECTION APPARATUS

This application is a continuation-in-part of application Ser. No. 614,510, filed May 29, 1984, now abandoned.

BACKGROUND OF THE INVENTION

The present invention relates to electromagnetically deflected cathode-ray-tubes and particularly to apparatus for correcting distortion of electron beams as caused by the magnetic field of an electromagnetic deflection yoke.

Electromagnetically deflected cathode-ray-tubes suffer from distortion of the spot written by the tube's electron beam or beams on the CRT screen as a result of nonuniformities in the magnetic deflection field. Thus, when a magnetic deflection yoke is energized to deflect an electron beam from its center position to a more peripheral position, the electrons in the electron beam may be deflected somewhat differently depending upon their position in the beam. As a result the electron beam becomes defocused despite the presence of focusing means in the electron gun that generates the beam. In one instance, as the beam is deflected radially outwardly from the center screen position, the spot tends to become elongated in a direction perpendicular to the direction of deflection. Thus, if the beam is deflected horizontally, to the right of center screen, the spot may tend to be elongated in a vertical direction. Although this astigmatism distortion is not sufficiently serious to prevent the use of electromagnetically deflected cathode-ray-tubes for many purposes, the distortion can be of considerable concern where finely detailed information is to be presented, e.g. on the screen of a computer terminal portraying a great deal of graphic and alphanumeric information. A raster scan may be employed in the case of CRTs used in these applications wherein the raster is composed of a large number of lines as compared with the conventional TV application.

A prior art apparatus for correcting the astigmatism produced in a single beam by an electromagnetic deflection yoke is described in Ray et al U.S. Pat. No. 3,961,223. This system employs a set of correction coils wound upon a separate annular magnetic core positioned around the neck of the cathode-ray-tube. Current is supplied to this set of coils, via amplifiers for converting correction voltages to coil currents. In a first pair of coils, a current is provided which is proportional to $(Vx)^2-(Vy)^2$, where $Vx$ and $Vy$ are horizontal and vertical deflection signals, while a second set of coils is provided a current proportional to $2VxVy$. Electromagnetic correction devices and the circuitry therefor tend to be expensive and cumbersome not only in respect to the cost of the equipment but also in regard to proper adjustment external to the cathode-ray-tube. Moreover, the correction achieved is somewhat approximate and does not take into account the considerable differences in the astigmatic distortion produced by different magnetic deflection yokes.

A similar problem is encountered in multi-beam tubes used for color television. For example, when utilizing a three beam in-line gun, a self-convergent deflection yoke characterized by a field with a third harmonic component insures convergence of the electron beams with horizontal deflection, i.e. deflection in the plane of the electron beam generating means. Although the result is electron beam convergence despite horizontal displacement of the electron beams, the effect of the field on the individual beam produces astigmatism distortion. Thus, vertical overfocusing occurs which can result in a vertically elongated spot or in a horizontally elongated spot as the result of added spherical aberration. Prior art electromagnetic correction is not possible without defeating the self-convergence desired for the three beams, and moreover electromagnetic correction is not able to correct for different degrees of astigmatism produced in the three beams as a result of their displaced positions. While some astigmatism correction has been provided in tubes employing in-line guns by shaping of beam-generating electrodes already present in the conventional gun, this attempt at correction is only partially effective and does not achieve correction dynamically. Other prior art astigmatism correction schemes are not capable of correcting differently distorted beams in an individual manner.

SUMMARY OF THE INVENTION

In accordance with the present invention in a particular embodiment thereof, astigmatism correction apparatus for an electromagnetically deflected cathode-ray-tube includes a first electrode in the tube's electron gun having a first transversely elongated slot through which an electron beam passes, and a second electrode in said electron gun, spaced along the path of the electron beam from the first electrode, the second electrode having a second transversely elongated slot through which the same electron beam also passes, wherein the slot in the second electrode is elongated at an angle to the slot in the first electrode. Means responsive to the deflection of the electron beam applies voltages to the first and second electrodes for distorting the cross section of the electron beam in an opposite sense to the distortion caused by the magnetic deflection yoke. As a result, the electron beam is restored in symmetry or point focus and is able to produce a finely defined spot despite the utilization of electromagnetic deflection means, and without the necessity for an additional magnetic core and coils surrounding the tube.

Further in accordance with the present invention, astigmatism correction apparatus for an electromagnetically deflected cathode-ray-tube employing a multibeam gun includes a plurality of electrodes each having an elongated slot through which one of the electron beams passes. Means responsive to the deflection of the electron beams applies voltages to the respective electrodes for distorting the cross section of the electron beams in a sense opposite to the distortion caused by magnetic convergence.

It is accordingly an object of the present invention to provide an improved astigmatism correction apparatus for electromagnetically deflected cathode-ray-tubes.

It is another object of the present invention to provide improved astigmatism correction apparatus for electromagnetically deflected cathode-ray-tubes wherein such apparatus is inexpensive and forms an integral part of the tube's electron gun.

It is a further object of the present invention to provide an improved astigmatism correction apparatus for electromagnetically deflected cathode-ray-tubes which is accurately adaptable to a particular tube and particular magnetic deflection yoke.

The subject matter of the present invention is particularly pointed out and distinctly claimed in the concluding portion of this specification. However, both the organization and method of operation together with further advantages and objects thereof may best be understood by reference to the following description taken in connection with the accompanying drawings wherein like reference characters refer to like elements.

DETAILED DESCRIPTION

Figure 1:
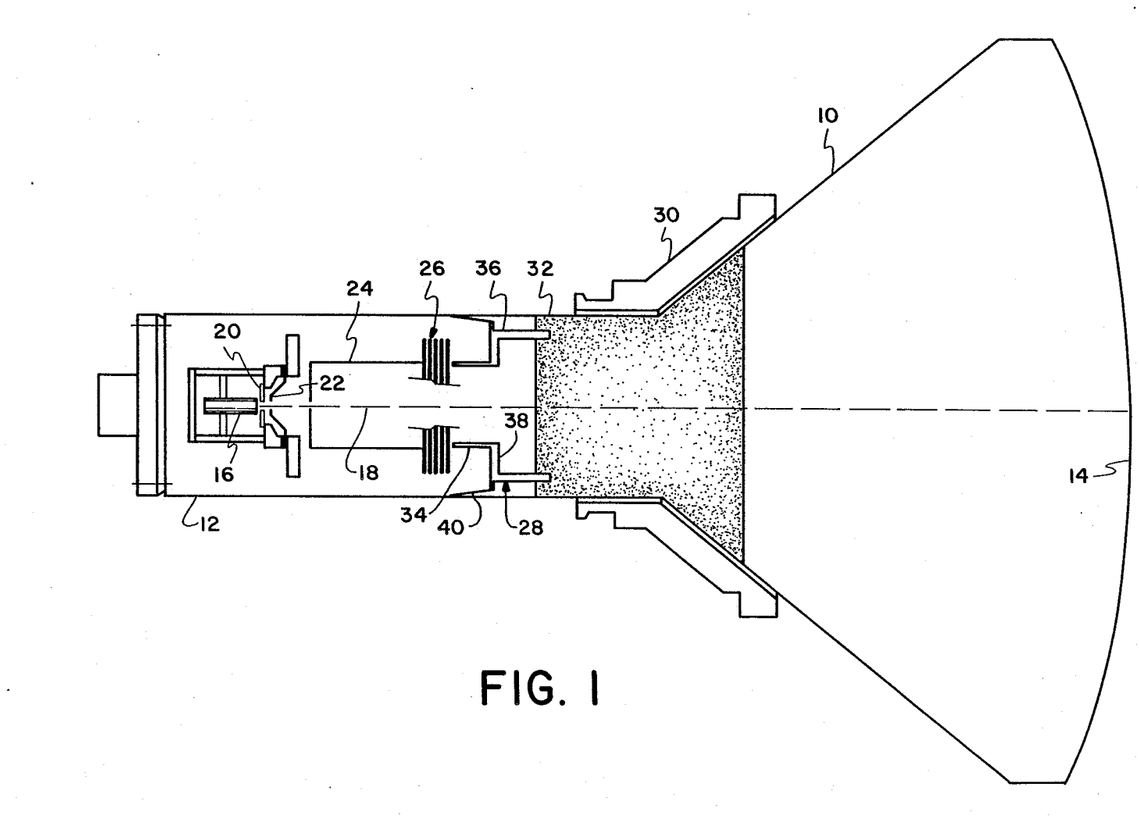
FIG. 1 is a longitudinal cross sectional representation of a magnetically deflected cathode-ray-tube employing astigmatism correction apparatus according to a first embodiment of the present invention.

Referring to the drawings and particularly to FIG. 1 illustrating a magnetically deflected cathode-ray-tube employing astigmatism correction apparatus according to the present invention in a first embodiment thereof, such cathode-ray-tube includes a forward funnel portion 10 and a rearward, cylindrical neck portion 12, the latter housing an electron gun apparatus emitting an electron beam for "writing" on the forward phosphor screen 14. The electron gun comprises a cathode 16 producing electron beam 18 which successively passes through apertures in grid 20 and second grid 22 and through an aperture in one end of anode cylinder 24. At the remote end of anode cylinder 24 the electron beam 18 traverses a group of wafer electrodes, generally indicated at 26, which will be further described with reference to FIG. 2. After exiting electrodes 26, the electron beam 18 successively passes through focus electrode 28 and magnetic deflection yoke 30. In addition, the inside of the tube in this area is provided with a high resistance coating 32 serving as a further electrode.

The cylindrical focus electrode 28 includes a smaller diameter cylindrical portion 34 positioned adjacent the electrode group 26, and a larger cylindrical portion 36 oriented toward the face of the tube and joined to portion 34 by radial flange 38. The focus electrode is supported in part from the interior of the neck portion 12 of the tube by "snubber" 40. The purpose of the focus electrode, which will be hereinafter explained in greater detail, is to focus the electron beam to a small spot for "writing" information on the face of the tube.

The magnetic deflection yoke 30 may be of substantially any type commonly used for deflecting an electron beam in a cathode-ray-tube in two orthogonal directions, but is preferably statorwound on a slotted ferrite core. Lizt wire coils and a suitable magnetic material are preferably used to reduce skin effect and core losses at high deflection frequencies.

Figure 2:
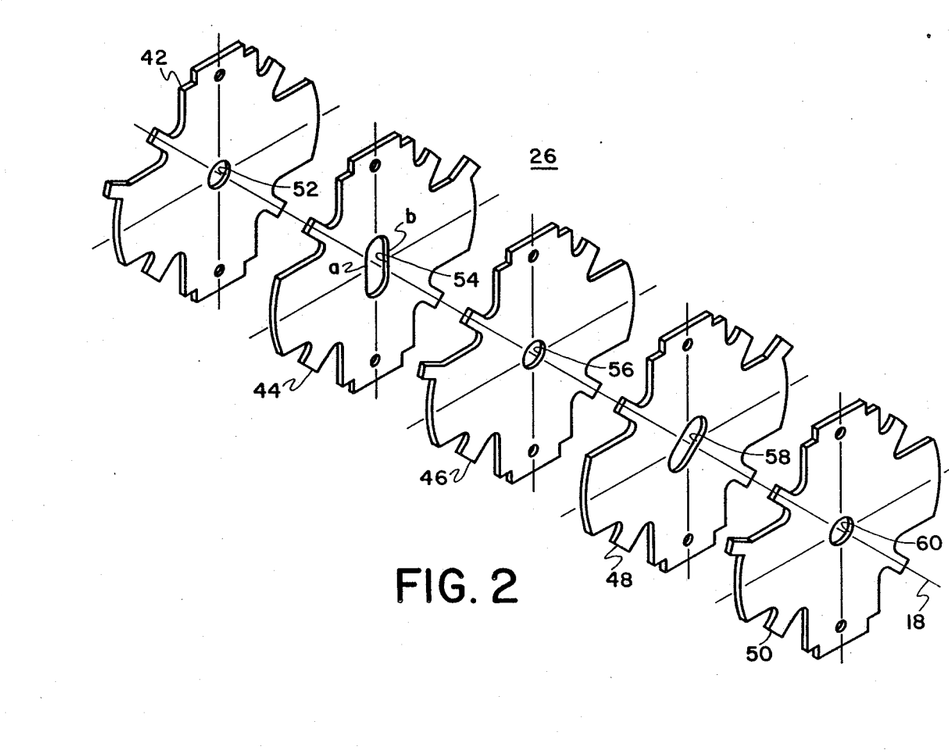
FIG. 2 is a perspective, exploded view of a plurality of stigmator electrodes according to the first embodiment of the present invention.

Referring more particularly to FIG. 2, illustrating electrode group 26 in greater detail, electron beam 18 successively passes through apertures in conductive metal wafer electrodes 42, 44, 46, 48 and 50. Apertures 52, 56 and 60 in wafers 42, 46 and 50 respectively are suitably round and of relatively small diameter. For example, in a specific embodiment aperture 52 had a diameter of 0.06 inches, aperture 56 had a diameter of 0.075 inches and aperture 60 had a diameter of 0.075 inches. Apertures 54 and 58, on the other hand, are oval or elliptical in shape, each having a long dimension, i.e. along the major axis, of 0.1 inches. Aperture 54 in the illustrated embodiment is oriented vertically, while aperture 58 is oriented at an angle of forty-five degrees to the vertical. The electrodes are positioned with the apertures aligned axially such that the electron beam from the anode will pass centrally through each of the apertures. the wafers 42, 44, 46, 48 and 50 are of equal thickness and evenly spaced, with the thickness in the particular embodiment being approximately 0.025 inches and the spacing being approximately 0.02 inches. Electrodes 42, 46 and 50 are connected electrically to anode 24.

The purpose of the electrode group 26 is the correction of astigmatism in the spot formed by beam 18 on screen 14, such astigmatism resulting from the deflection action of yoke 30. Assuming the beam 18 is initially correctly focused to a small round spot at the center of the screen, i.e. without deflection, it is found in some cases that deflection of the beam radially outwardly of the screen by yoke 30 produces a somewhat oblong or elliptical spot wherein the major axis of the ellipse is transverse to the direction of deflection. Although in some instances elongation in an opposite sense is produced, dependent on the particular deflection apparatus, and although either effect can be corrected by the present invention, in the present example a distortion will be considered that produces elongation in a direction transverse to the direction of deflection. In this instance, if the spot is deflected along the x axis or horizontally of the face of the tube to a point far to the right of the center of the tube, the spot will become oblong or elliptical in the vertical or y direction. Of course, the same phenomenon occurs for deflection in the y direction to produce a spot oblong in the x direction. This distortion of the spot is attributable to the magnetic field provided by yoke 30, wherein such magnetic field is characterized by a nonuniform intensity between the center line of the yoke and the inside diameter of tube neck portion 12, the intensity increasing as the tube neck is approached. The electron beam 18 is really cone shaped in this region, being focused from a wider diameter at the position of anode 24 to a narrow spot diameter on the cathode-ray-tube screen as a result of the action of focusing electrode 28 (cooperating with coating 32). As the electron beam passes through yoke 30 and is deflected somewhat outwardly from a focused center position, the electrons on the most radially outward part of the cone will be deflected more than the electrons on the most radially inward part of the cone, resulting in a different lensing action in the radial direction than in the transverse direction.

Figure 7:
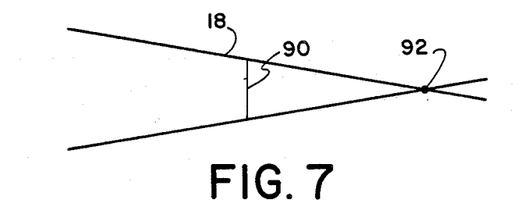
FIG. 7 is a schematic representation illustrating astigmatism distortion produced in an electromagnetically deflected cathode-ray-tube, FIG. 8 schematically illustrates electrostatic correction of astigmatism produced by electromagnetic deflection.

Assuming the beam is deflected in the x direction of the screen, or horizontally, the spot produced by the electron beam on screen 14 would tend to become slightly larger, even without the distortion produced by yoke 30, inasmuch as the longer distance the beam travels to reach the screen causes the beam to reach the screen slightly beyond its point focus. However, as the result of the nonuniform magnetic field generated by yoke 30, the electrons in the horizontal plane, (still assuming x axis deflection) are spread apart, and this x axis lensing action of yoke 30 causes the electrons in the horizontal plane to come to a focus at a point farther downstream in the electron beam than they would otherwise. The electrons in the vertical plane, on the other hand, are relatively unaffected except for the general focusing action of the deflection field and continue diverging beyond the focal point. FIG. 7 is a plan view of the above described beam characterized by a horizontal line focus at 90 (produced by vertically focused electrons) and a vertical line focus 92 (produced by horizontally focused electrons). The electron beam intersects screen 14 beyond point 92 where the electrons in the vertical plane are more widely separated than those in the horizontal plane, causing the elongated spot in the vertical direction. Of course, the same explanation applies to deflection in the vertical direction or in any other direction for that matter.

The distorted beam can be brought to a better focus simply as a result of a dynamic focusing voltage applied to electrode 28 and appropriately responsive to the deflection of the electron beam. Thus, the electron beam may be made to intersect screen 14 coincident with its circle of least confusion (between line focuses 90 and 92 in FIG. 7) to provide a substantially round spot despite the presence of yoke-caused astigmatism. However, this spot does not represent the optimum condition since it is not as small as the spot resulting from a beam focused to a single point, i.e. the spot which can be produced at the center of the screen.

In accordance with the present invention, electron lenses are formed by "stigmator" wafers 44 and 48 in FIG. 2 in conjunction with the wafers 42, 46 and 50 on either side thereof. Wafers 42, 46 and 50 are electrically connected to anode electrode 24 which, in the specific embodiment, was 3.5 KV positive with respect to the cathode of the electron gun. Dynamic correction voltages are applied to wafers 44 and 48 for the purpose of restoring a single point focus for the electron beam and this point focus is positionable at screen 14 by adjustment of the voltage applied to electrode 28. Wafer 44 forms an electron lens with wafers 42 and 46, while wafer 48 forms an electron lens with wafers 46 and 50.

Figure 8:
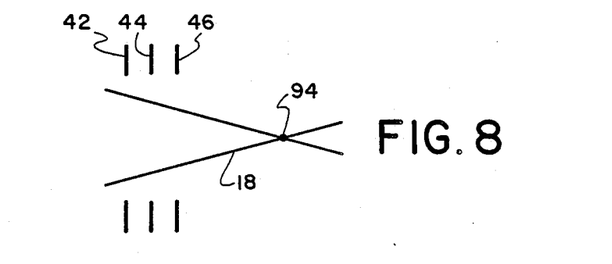

Considering wafer electrode 44, substantially zero correction voltage is applied thereto in the absence of any deflection by yoke 30. In fact for the zero deflection condition the voltage applied to wafer electrode 44 isw 3.5 KV in the present embodiment, i.e. the same voltage as applied to anode 24 as well as to wafer electrodes 42 and 46. When the electron beam is then deflected horizontally (after the electron beam passes through the electrode group 26) a relatively negative voltage is simultaneously applied to wafer electrode 44, this voltage being responsive to the extent of deflection in the horizontal or x direction. The relatively negative voltage produces a lensing action with respect to the electron beam, between edges a and b of vertical slot 54 in electrode 44, causing the electrons on opposite sides of the beam (closest to edges a and b) to be repelled from electrode 44 or drawn closer together. This action counteracts the lensing produced by yoke 30 and results in a more axially symmetrical beam capable of producing a smaller spot on screen 14, i.e. wherein the sagittal (radial) and tangential line focuses are brought together at a point. The result is illustrated in FIG. 8, i.e. a single point focus 94.

Now considering deflection of the electron beam in a vertical direction by yoke 30, it will be seen the same wafer electrode 44 can again be employed to restore the unitary point focus of the beam. In this instance, a relatively more positive voltage (higher than 3.5 KV) is applied to wafer electrode 44 as the beam is deflected downstream of electrode group 26 by yoke 30 in a vertical direction. As a result, the electrons across the horizontal section of the beam are brought farther apart (between edges a and b) to restore the unitary point focus of the beam and counter the distortion caused by yoke 30. In the case of vertical deflection of the electron beam by yoke 30, the electrons in the vertical plane of the beam are spread apart by the lensing action of the yoke so as to tend to position the focal point of the electrons in the vertical plane farther downstream. The relatively unaffected electrons in the horizontal plane of the electron beam pass through their focal point and tend to produce an elongated spot transverse to the vertical direction of deflection. Spreading the electrons in the horizontal plane by means of electrode 44 restores the desired single point focus.

It will be observed that if the deflection of the electron beam on the screen is intermediate vertical deflection and horizontal deflection, for instance at an angle approaching forty-five degrees, neither a relatively positive voltage nor a relatively negative voltage, when applied to wafer electrode 44, will produce the desired effect. As the deflection angle changes between the horizontal and the vertical, it would seem the voltage applied to wafer electrode 44 would have to change from a relatively negative value to a relatively positive value, passing through zero at a beam deflection angle of about forty-five degrees. At zero relative voltage applied to wafer electrode 44 (actually the 3.5 KV of the anode 24) the wafer electrode 44 has substantially no effect.

Therefore a second electron lens construction is provided which includes wafer electrode 48 having a slot 58 disposed at an angle intermediate the vertical and horizontal, and specifically at an angle of forty-five degrees in the illustrated embodiment. The wafer electrode 48 cooperates with electrodes 46 and 50 on either side thereof to provide an electron lens effective in restoring a unitary electron beam focus in response to voltages applied to electrode 48 when the electron beam is deflected in a diagonal direction. Assuming the electron beam is deflected downwardly and to the right (at a minus forty-five degrees with respect to the horizontal), then a relatively negative voltage is applied to wafer electrode 48 for restoring beam point focus by analogy to the operation of wafer electrode 44 for deflection in the horizontal direction. Of course, the same effect holds for deflection of the electron beam upwardly and to the left on the screen, i.e. at an angle of 135 degrees.

Similarly, for deflection on the screen at a positive forty-five degrees or at a positive 225 degrees, a relatively positive voltage is applied to wafer electrode 48 by analogy to the operation of electrode 44 for deflection in the vertical direction.

With the combined action of the lenses formed with electrodes 44 and 48, proper correction can be applied for any deflection angle. The electrodes 42, 46 and 50, in addition to completing electron lenses with respective electrodes 44 and 48, also provide shielding, and specifically electrode 46 provides shielding between electrodes 44 and 48. The action of the lenses formed by the electrode group 26 may be viewed as one of producing a counter-distortion to the distortion caused by yoke 30.

To a first approximation, the voltage applicable to electrode 44 for achieving the desired corrective effect is proportional to the difference of the squares of the x and y deflection values, i.e. $(y^2-x^2)$. The voltage applicable to electrode 48, to a first approximation, is proportional to the produce of the x and y deflection, i.e. $2xy$. However, approximate correction values are not sufficiently accurate to compensate for the astigmatism effects caused by most deflection yokes, and the same correction values cannot be used to correct for different deflection yokes of apparently identical construction. It is therefore desirable to tailor the voltages applied to the stigmator wafer electrodes to the astigmatism caused by the particular yoke utilized. In the present apparatus, the voltages appropriate for correcting astigmatism for specified areas of beam deflection, i.e. for certain areas of the CRT screen, are stored in memory and accessed by signals related to the deflected positions of the electron beam.

Figure 3:
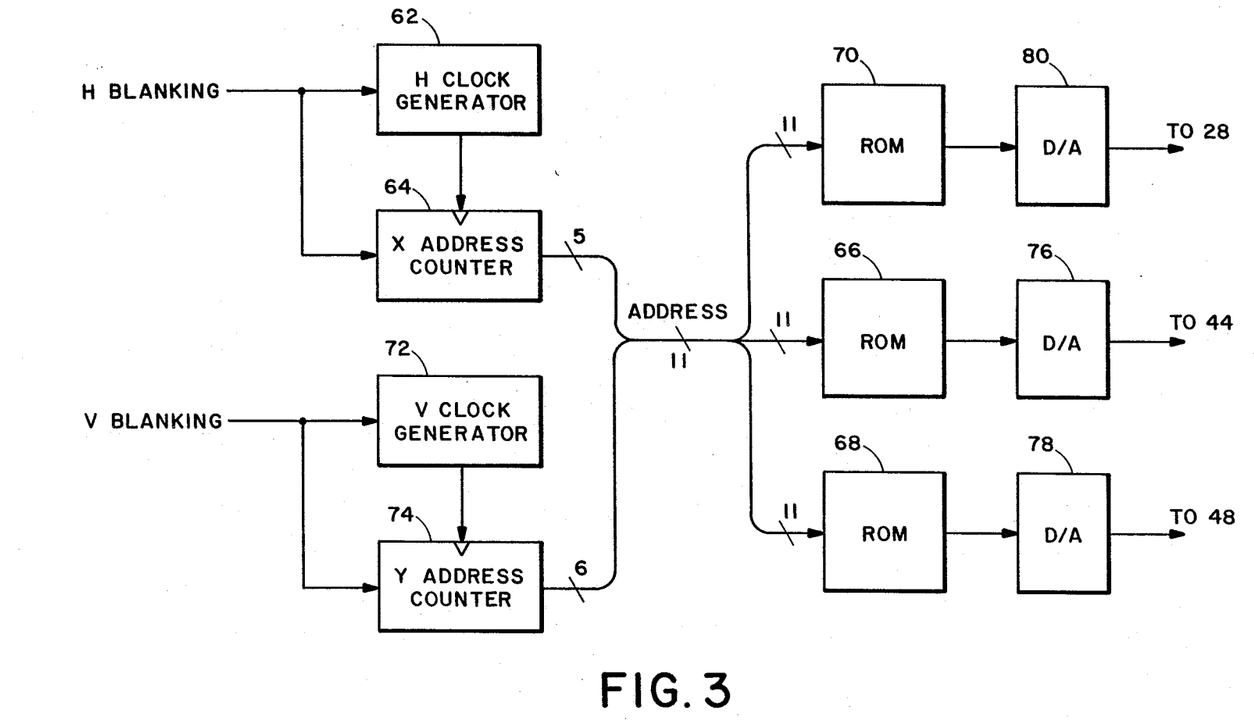
FIG. 3 is a block diagram of memory means for storing correction voltages applicable to FIG. 2 stigmator electrodes.

It is assumed for present purposes that a raster scan is produced by conventional horizontal and vertical deflection circuitry (not shown) connected to yoke 30. Referring to FIG. 3, the horizontal blanking signal from such circuitry is connected as the synchronization input to a horizontal clock generator 62. Clock generator 62 supplies twenty evenly spaced clock pulses between horizontal blanking pulses, i.e. twenty pulses are supplied for each horizontal scan line across the face of the CRT. These clock pulses drive X address counter 64 which is used, in part, to address ROMs (read only memories) 66, 68 and 70. The horizontal blanking pulse reset the address counter 64 at the end of each horizontal scan.

The vertical blanking signal drives vertical clock generator 72 which outputs sixty-four evenly spaced clock pulses between vertical blanking pulses. These clock pulses drive Y address counter 74 which cooperates in addressing ROMs, 66, 68 and 70. The vertical blanking pulse resets the Y address counter at the end of each vertical scan.

The ROMs 66, 68 and 70 each have eleven bit addresses, with the five least significant bits being provided by counter 64 and the six most significant being supplied from counter 74. As a result, 1,280 (or $20\times64$) addresses are sequentially supplied to each of the ROMs for 1,280 distinct regions of the cathode-ray-tube screen. Each location in ROMs 66 and 68 stores the identification of a unique correction voltage for application to electrodes 44 and 48 respectively for providing proper correction for the electron beam as deflected to each particular region. ROM 70 similarly stores 1,280 values of dynamic focus correction voltage for application to focus electrode 28 for each of the 1,280 deflection regions. Of course, the selection of 1,280 regions on the screen is somewhat arbitrary and any desired division of the screen can be utilized. This number of regions is found sufficient for properly correcting the astigmatism over the face of most CRTs.

The numerical output accessed from ROM 66 is applied to digital-to-analog converter 76 which converts the numerical value to the proper voltage for application to electrode 44. Similarly, the output of ROM 68 is converted to the desired voltage by digital-to-analog converter 78 for application to electrode 48. The accessed output of ROM 70 is applied to digital-to-analog converter 80 from which the focus voltage for electrode 28 is derived.

In accumulating the data for storage in ROM 66, as well as for the other ROMs, a particular cathode-ray-tube with a particular magnetic deflection yoke installed is operated and the electron beam thereof is deflected by conventional x and y deflection circuitry (not shown) to write twenty-five evenly separated points on the face of the CRT. At each point, the voltages for electrodes 44, 48 and 28 are adjusted to achieve the smallest and most symmetrical, i.e. round, spot. Table A is an example of the voltages found applicable to the electrode 44 in a given instance to procure the best spot. The Z points in the table represent evenly spaced points over the screen of the CRT, $Z(1,1)$ at the lower left hand corner of the face to $Z(5,5)$ at the upper right hand corner. These voltages are, of course, relative to the 3.5 KV of the cathode-ray-tube anode.

TABLE A

| Z(1,5) | Z(2,5) | Z(3,5) | Z(4,5) | Z(5,5) |
|---|---|---|---|---|
| −42.6 | −3.4 | +3.1 | −6.6 | −54. |
| Z(1,4) | Z(2,4) | Z(3,4) | Z(4,4) | Z(5,4) |
| −58.5 | −15.7 | −6.7 | −17.7 | −62.2 |
| Z(1,3) | Z(2,3) | Z(3,3) | Z(4,3) | Z(5,3) |
| −54.4 | −17.1 | −7.5 | −21.3 | −60.9 |
| Z(1,2) | Z(2,2) | Z(3,2) | Z(4,2) | Z(5,2) |
| −56.1 | −16.3 | −5.8 | −21.9 | −72.4 |
| Z(1,1) | Z(2,1) | Z(3,1) | Z(4,1) | Z(5,1) |
| −36.2 | −4.2 | +2.1 | −12.2 | −47.4 |

The input data from Table A is used to generate a surface-describing equation to fit the data and is given by an expression of the following form:

$$V_z = \sum_{m=0}^{4} \sum_{n=0}^{4} a_{mn} x^m y^n$$

The actual formula in powers of x and y which fits the Table A data is given in tabular form in Table B.

TABLE B $+1.99324 * 10^{-5} * x^4 * y^4$
$+1.92512 * 10^{-6} * x^4 * y^3$
$-6.66574 * 10^{-4} * x^4 * y^2$
$-9.44977 * 10^{-4} * x^4 * y^1$
$-1.86034 * 10^{-3} * x^4 * y^0$
$+6.24036 * 10^{-5} * x^3 * y^4$
$-2.10431 * 10^{-4} * x^3 * y^3$
$-1.72724 * 10^{-3} * x^3 * y^2$
$+3.41432 * 10^{-3} * x^3 * y^1$
$+3.69291 * 10^{-3} * x^3 * y^0$
$+1.56372 * 10^{-4} * x^2 * y^4$
$-1.93923 * 10^{-3} * x^2 * y^3$
$+6.31519 * 10^{-3} * x^2 * y^2$
$+7.74263 * 10^{-2} * x^2 * y^1$
$-9.32312 * 10^{-1} * x^2 * y^0$
$-1.67873 * 10^{-3} * x^1 * y^4$
$+7.49206 * 10^{-4} * x^1 * y^3$
$+3.60159 * 10^{-2} * x^1 * y^2$
$+7.24603 * 10^{-2} * x^1 * y^1$
$-6.45238 * 10^{-1} * x^1 * y^0$
$+1.08800 * 10^{-2} * x^0 * y^4$
$+1.49333 * 10^{-2} * x^0 * y^3$

TABLE B-continued $+1.32000 * 10^{-1} * x^0 * y^2$
$-2.73333 * 10^{-1} * x^0 * y^1$
$-7.50000 * 10^{-0} * x^0 * y^0$ ROM 66 is loaded with the correct voltage values for application to electrode 44 in response to various values of x and y deflection, in accordance with the formula set forth in Table B. 1,280 values corresponding to 1,280 screen areas are stored in ROM 66.

Figures 4, 5:
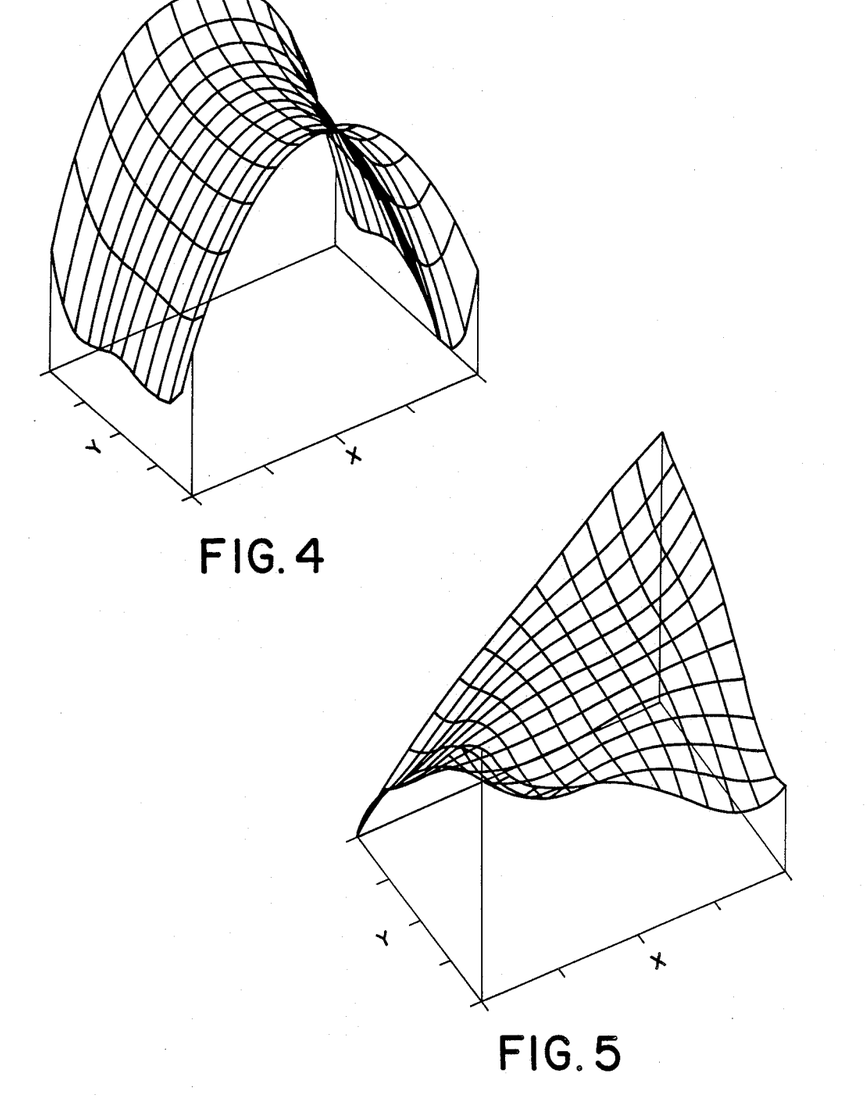
FIG. 4 is a three dimensional plot of correction voltages applied to a first stigmator electrode.
FIG. 5 is a three dimensional plot of correction voltages applied to a second stigmator electrode.

FIG. 4 is a three dimensional plot illustrating the voltages (from ROM 66) applied to electrode 44 for deflection values over the face of the CRT where X corresponds to horizontal deflection and Y corresponds to vertical deflection. It should be emphasized that this particular plot and the voltages represented thereby are given only by way of example and will be different according to the particular tube and particular deflection yoke for which astigmatism is being corrected.

Table C sets forth the formula in powers of x and y for the correction voltages applicable to wafer electrode 48 in the particular example.

TABLE C $-2.33680 * 10^{-5} * x^4 * y^4$
$-7.59683 * 10^{-5} * x^4 * y^3$
$+6.79161 * 10^{-4} * x^4 * y^2$
$+9.85700 * 10^{-4} * x^4 * y^1$
$+5.55324 * 10^{-4} * x^4 * y^0$
$+1.29161 * 10^{-4} * x^3 * y^4$
$-4.94461 * 10^{-4} * x^3 * y^3$
$-3.32621 * 10^{-3} * x^3 * y^2$
$+1.31195 * 10^{-2} * x^3 * y^1$
$+6.60836 * 10^{-3} * x^3 * y^0$
$+1.08735 * 10^{-3} * x^2 * y^4$
$+3.23810 * 10^{-3} * x^2 * y^3$
$-3.25918 * 10^{-2} * x^2 * y^2$
$-5.01701 * 10^{-2} * x^2 * y^1$
$-1.08844 * 10^{-2} * x^2 * y^0$
$-3.83746 * 10^{-3} * x^1 * y^4$
$+2.14476 * 10^{-2} * x^1 * y^3$
$+1.03984 * 10^{-1} * x^1 * y^2$
$+3.16667 * 10^{-2} * x^1 * y^1$
$+2.76190 * 10^{-1} * x^1 * y^0$
$+2.45333 * 10^{-3} * x^0 * y^4$
$-1.86667 * 10^{-2} * x^0 * y^3$
$-9.53333 * 10^{-2} * x^0 * y^2$
$+4.76667 * 10^{-1} * x^0 * y^1$
$+5.10000 * 10^{0} * x^0 * y^0$

FIG. 5 is a three dimensional plot of the voltages applicable to electrode 48 over the range of X and y deflection as obtained from the formula of Table C. Again 1,280 values are stored in ROM 68 corresponding to 1,280 separate areas of the screen.

Table D sets forth the formula for the focus correction voltage applicable to focus electrode 28.

TABLE D $-4.53145 * 10^{-5} * x^4 * y^4$
$+1.48086 * 10^{-6} * x^4 * y^3$
$+1.59378 * 10^{-3} * x^4 * y^2$
$-1.17544 * 10^{-3} * x^4 * y^1$
$-1.66597 * 10^{-3} * x^4 * y^0$
$-1.03661 * 10^{-5} * x^3 * y^4$
$+7.98186 * 10^{-4} * x^3 * y^3$
$-1.64561 * 10^{-3} * x^3 * y^2$
$-1.23745 * 10^{-2} * x^3 * y^1$
$+1.55491 * 10^{-2} * x^3 * y^0$
$+9.90476 * 10^{-4} * x^2 * y^4$
$+2.59410 * 10^{-3} * x^2 * y^3$
$-3.53061 * 10^{-2} * x^2 * y^2$
$+3.07256 * 10^{-2} * x^2 * y^1$
$+3.65306 * 10^{0} * x^2 * y^0$
$-3.83492 * 10^{-3} * x^1 * y^4$

Figure 6:
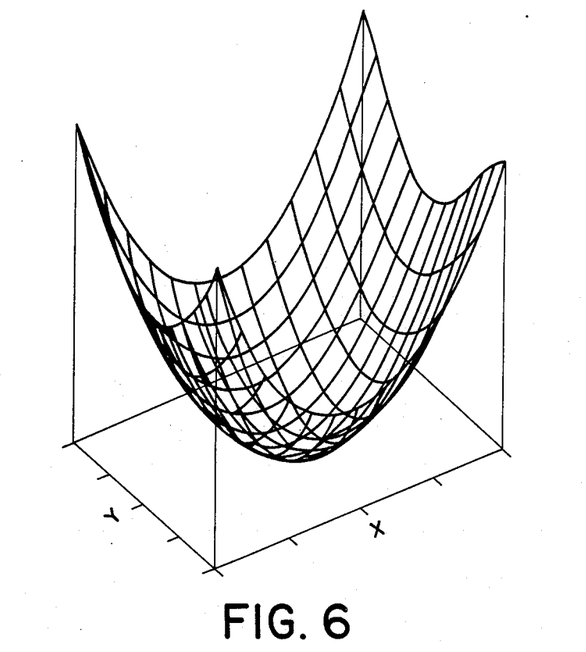
FIG. 6 is a three dimensional plot of voltages applied to a focus electrode in the FIG. 1 cathode-ray-tube.

TABLE D-continued $-1.58730 * 10^{-2} * x^1 * y^3$
$+1.82063 * 10^{-1} * x^1 * y^2$
$+7.53968 * 10^{-2} * x^1 * y^1$
$-1.47619 * 10^{-0} * x^1 * y^0$
$+7.46667 * 10^{-3} * x^0 * y^4$
$-6.93333 * 10^{-2} * x^0 * y^3$
$+3.63333 * 10^{0} * x^0 * y^2$
$+1.23333 * 10^{0} * x^0 * y^1$
$+2.50800 * 10^{+3} * x^0 * y^0$ FIG. 6 is a three dimensional plot of the voltages as derived from the formula of Table D and as stored in ROM 70 for application to focus electrode 28. To a first approximation, the focus correction is proportional to $(x^2+y^2)$, but it will be seen that for the particular tube under consideration, the correction varies therefrom.

As will be understood, the data of the type described in Table A will be obtained for the wafer electrode 48 and the focus electrode 28, as well as for the wafer electrode 44, and then the corresponding formula (Table B, C or D) is derived by known computational techniques for providing an interpolated approximation for remaining points across the face of the CRT. In each case, twenty-five simultaneous equations are solved in a known manner to provide the constants in the first columns of Tables B, C and D, using the correction and deflection values (Table A type data) for each of twenty-five points. The Table B, C and D formulas are then employed to obtain the values for storage in the ROMs.

The cathode-ray-tube with correction according to the first embodiment of the present invention is able to produce an electron beam with extremely high definition for writing a small spot on the screen of the cathode-ray-tube at substantially any point over its area. Therefore, such cathode-ray-tube can portray detailed data and graphic information for use in computer terminals and the like.

Figure 9:
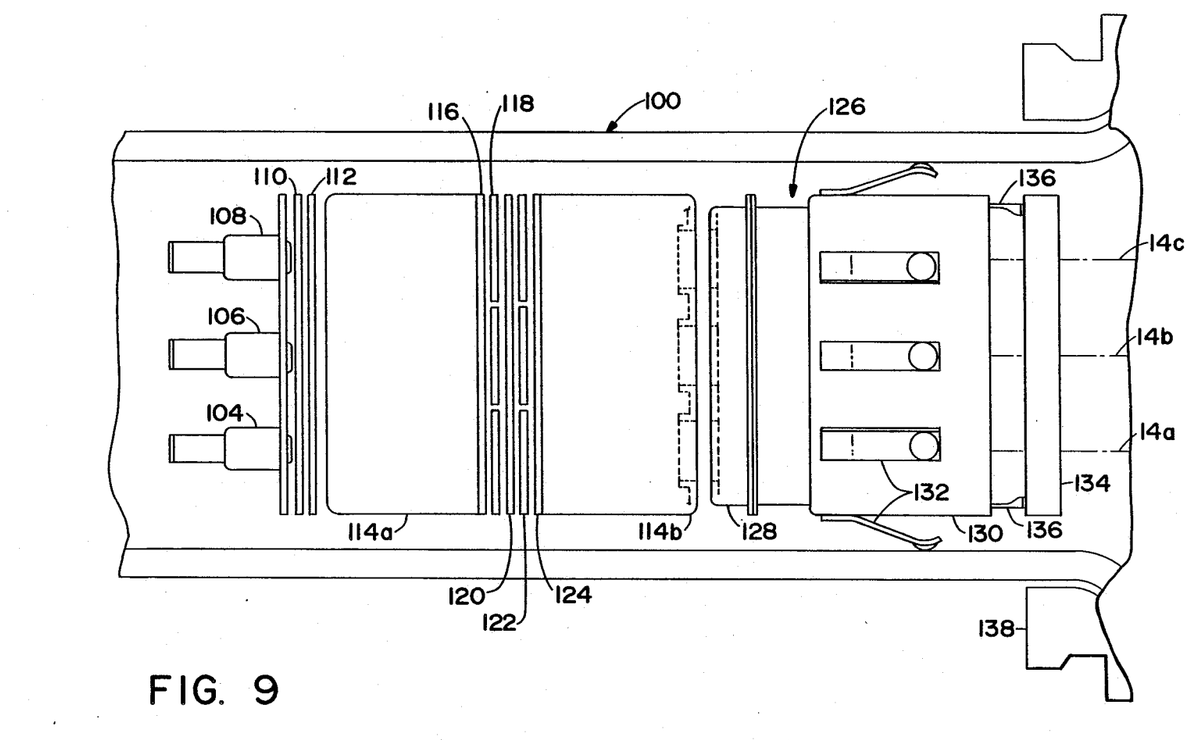
FIG. 9 is a longitudinal cross section representation, partially broken away, of a magnetically deflected cathode-ray-tube utilizing an in-line, three color gun employing astigmatism correction apparatus according to an embodiment of the present invention.
Figure 10:
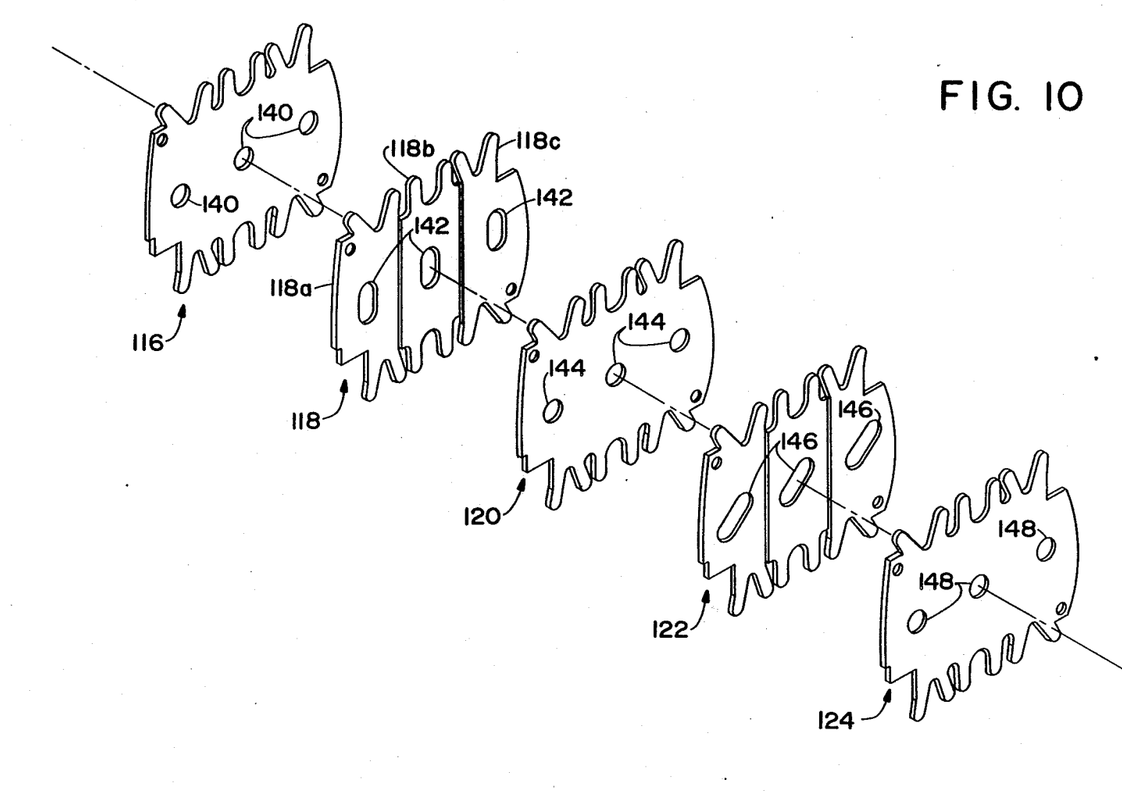
FIG. 10 is a perspective, exploded view of a plurality of stigmator electrodes according to a second embodiment of the present invention.

Referring to FIGS. 9 and 10, astigmatism correction apparatus according to a second embodiment of the present invention is illustrated. As hereinbefore mentioned, a three color gun structure for the simultaneous production of three electron beams is characterized by astigmatism problems as a result of the action of the self convergent yoke employed. The problem is aggravated because of the random alignment of neck magnets used to correct for purity and convergence.

Referring to FIG. 9, an in-line color gun structure includes respective cathode elements 104, 106 and 108, a beam forming electrode (G1) 110 for initially shaping the beam, a beam forming and accelerator electrode (G2) 112, a main focusing electrode (G3) 114, and a final accelerator electrode (G4) 126 including parts 128 and 130. The electrode members 110, 112, 114 and 128 are elongated in the lateral direction as illustrated in plan view in FIG. 9, to accommodate the generation of the three electron beams, 14a, 14b and 14c, directed toward shadow mask structure or the like at the screen end of the tube. A common gun centering member 130 which is circular in cross section is secured to the forward end of accelerator and convergence member 128. Member 130 is provided with a plurality of spring tabs 132 for centering the structure with regard to the inside wall of tube neck 100 and which may make conductive connection with a coating on the inside wall of the tube. A ring getter 134 is suitably attached to electrode member 130 by means of support elements 136. The various electrodes forming the in-line gun are supported with respect to one another by a plurality of insulating support rods (not shown).

A common deflection yoke 138 is used for simultaneously deflecting the electron beams 14a, 14b and 14c in a raster pattern or the like. As is well known in the art, the yoke 138 is desirably of the self convergent type for maintaining the coincidence of the electron beams 14a, 14b and 14c as they are simultaneously scanned across the face structure of the tube. The in-line gun is dimensioned such that in the absence of a deflection field, the electron beams will converge at screen center. However, without the self convergence feature, the three electron beams would not converge as the beams are deflected in a horizontal direction, for example. The deflection yoke 138 is consequently designed to provide a third harmonic field component tending to spread the beams apart whereby the convergence point will not lie too far inwardly of the cathode-ray-tube screen to produce a common spot.

However beneficial the self-convergence feature may be in insuring tracking of the three electron beams across the cathode-ray-tube screen structure, the effect on the individual beam is not unlike that described in connection with the previously illustrated embodiment of the present invention. The individual electron beam suffers from astigmatic distortion and at least in theory will tend to produce a vertically elongated spot on the screen of the cathode-ray-tube in the manner described in connection with FIGS. 7 and 8 as a consequence of horizontal deflection. In practice, the spot formation is somewhat more complex because of spherical aberration produced by the rather small diameter individual lensing action of the in-line gun structure. Because of this spherical aberration, and underfocusing of the central portion of the beam, a spot which is also elongated horizontally for deflection in a horizontal direction can result. A bright center core is elongated horizontally, and the beam edge is elongated vertically. The astigmatic distortion is more pronounced for the one of the three beams closest to the direction of deflection. Thus, viewing the cathode-ray-tube structure of FIG. 9 from the "screen end", if the three electron beams are simultaneously deflected to the right (upwards in FIG. 9) the spot produced by beam 14c will be the most distorted, followed by less distortion in the spot provided by beam 14b and even less distortion for the spot provided by beam 14a. In fact, the beam 14a is deflected through a lesser angle when deflection is to the right, and beam 14c is deflected through a greater angle.

The undesired astigmatism is suitably corrected by the interposition of metal wafer electrodes 116, 118, 120, 122 and 124 which operate in a manner substantially similar to the wafer electrodes hereinbefore described in connection with the embodiment of FIGS. 1 and 2. The electrodes 116 and 124 are suitably adjacent and connected to split sections 114a and 114b of the G3 focusing electrode, i.e. to the focusing voltage. Intermediate electrode 120 is also connected to focusing electrode 114. Split electrode structures 118 and 122 are disposed between electrodes 116, 120 and 124 respectively to provide a predistorting lens action.

The wafer electrodes are more fully illustrated in exploded fashion in FIG. 10 where it is seen that electrode 116 is provided with round apertures 140, while electrode 120 is provided with round apertures 144 and electrode 124 includes round apertures 148, respectively aligned along the path of the three electron beams. Electrode structure 118 actually comprises three separate electrodes 118a, 118b and 118c which are provided with similar, vertically elongated apertures 142 through which the respective electron beams pass. Also electrode structure 122 is divided into three parts, each including an aperture 146 elongated upwardly and to the right at an angle of forty-five degrees, for passing the respective electron beams. The sections of the electrode structures 118 and 122 are suitably driven by circuitry of the type described in connection with FIG. 3, with a ROM 66 storing correction voltages for one of the electrodes of structure 118 and with a ROM 68 storing correction values for the corresponding section of electrode structure 122 along the same electron beam. This circuitry is duplicated for the electrode structure associated with each of the electron beams, and the values stored in the respective ROMs are ascertained in the hereinbefore described manner wherein correct voltages are selected after deflection to evenly separated points to achieve the smallest and most symmetrical spot. Thereafter, equations are generated as hereinbefore described for interpolating a larger number of locations. In the instance of the in-line color gun, the focusing voltage can be left constant rather than being variable with screen position.

In the instance of correction of astigmatism for the three color in-line gun, it will be seen that a relatively constant form of aberration is produced primarily as a function of horizontal deflection. Therefore, in some instances it is possible to employ only the electrode structure 118, together with wafer electrodes 116 and 120 on either side thereof, without the addition of electrode structures 122 and 124. However, the complete set of wafer electrodes is desirable for optimum correction because the astigmatism is to a lesser extent a function of deflection in other directions. Furthermore, some degree of correction can be achieved without the electrode structures 118 and 122 being split into three parts respectively as shown, i.e. where a common correction voltage is applied with respect to each of the electron beams. However, since the astigmatism produced is different for each of the beams as hereinbefore mentioned, a more desirable result is achieved by applying individual correction voltages to electrode elements which are individual to each beam.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. Astigmatism correction apparatus for an electromagnetically deflected cathode-ray-tube having an electron gun including beam-forming, accelerator and focusing electrodes forming an electron beam and an electromagnetic deflection yoke which establishes two orthogonal deflection fields and deflects said electron beam across a screen of said cathode-ray-tube in response to beam deflection signals applied to said electromagnetic deflection yoke, and wherein said magnetic deflection yoke produces distortion of said electron beam, said apparatus comprising:

electrostatic correction means disposed along said electron beam and through which said electron beam passes before reaching said deflection yoke, said electrostatic correction means, comprising at least first, second and third plate-form electrodes spaced along the direction of the electron beam and each having an aperture through which said beam passes, the aperture in the first electrode being non-circular and being elongated in a direction parallel to one of the two deflection fields, the aperture in the third electrode being non-circular and being elongated in a direction intermediate the directions of the two deflection fields, and the aperture in the second electrode, which is disposed between the first and third electrodes, being circular, and means connected to said electrostatic correction means and responsive to the beam deflection signals for varying the electrostatic field produced by said electrostatic correction means to compensate dynamically for the distortion caused by said deflection yoke at a plurality of predetermined locations on said screen.

2. Astigmatism correction apparatus for an electromagnetically deflected cathode-ray-tube having an electron gun including beam-forming, accelerator and focusing electrodes forming an electron beam and an electromagnetic deflection yoke deflecting said electron beam across a screen of said cathode-ray-tube in response to beam deflection signals applied to said electromagnetic deflection yoke, and wherein said magnetic deflection yoke produces distortion of said electron beam, said apparatus comprising:

first, second and third plate-form electrodes spaced along said electron beam and having apertures through which said electron beam passes, the aperture in the second electrode being circular and the apertures in the first and third electrodes being non-circular and angularly displaced relative to each other, and means responsive to the beam deflection signals for dynamically applying separate correction voltages to said first and third electrodes, said correction voltages producing counter-distortion of said electron beam as the result of the non-circularity of the apertures in the first and third electrodes compensating the distortion produced by said deflection yoke at a plurality of predetermined locations on said screen.

3. The apparatus according to claim 2 further including means responsive to said beam deflection signals for dynamically applying an error voltage to said focusing electrode to focus said electron beam at said predetermined locations on the screen of said cathode-ray-tube.

4. Astigmatism correction apparatus for an electromagnetically deflected cathode-ray-tube having an electron gun including beam-forming, accelerator and focusing electrodes forming an electron beam and an electromagnetic deflection yoke deflecting said electron beam across a screen of said cathode-ray-tube in response to beam deflection signals applied to said electromagnetic deflection yoke, and wherein said magnetic deflection yoke produces distortion of said electron beam, said apparatus comprising:

a first plate-form electrode in said electron gun, said first electrode having a transversely elongated slot through which said electron beam passes before reaching said deflection yoke, a second plate-form electrode in said electron gun spaced along the path of said electron beam from said first electrode, said second electrode having a circular aperture through which said electron beam passes before reaching said deflection yoke, a third plate-form electrode in said electron gun spaced along the path of said electron beam from said second electrode, said third electrode having a transversely elongated slot through which said electron beam passes before reaching said deflection yoke, said slot in said third electrode being elongated at an angle to the slot in the first electrode, and means responsive to the deflection of said electron beam for applying correction voltages to said first, second and third electrodes counter-distorting the cross section of said electron beam in a compensating sense to the distortion caused by said deflection yoke at a plurality of predetermined locations on the screen of said cathode-ray-tube.

5. The apparatus according to claim 4 wherein said voltage applying means comprises means addressable in accordance with said deflection signals for storing values representing the correction voltages appropriate for application to said electrodes for bringing about the counter-distortion at the plurality of predetermined locations on the screen.

6. The apparatus according to claim 4 wherein the slot in said first electrode is elongated in a direction of one of two orthogonal deflection fields of said deflection yoke, and wherein the slot in said third electrode is elongated in a direction intermediate the direction of the two orthogonal deflection fields of said deflection yoke.

7. The apparatus according to claim 6 wherein the slot in the third electrode is elongated at an angle of approximately forty-five degrees from the slot in the first electrode.

8. The apparatus according to claim 4 wherein said voltage applying means applies a voltage to said first electrode which to a first approximation is proportional to the difference of the squares of orthogonal deflection values applied to said deflection yoke, and wherein said voltage applying means further applies a voltage to said third electrode which to a first approximation is proportional to the produce of the deflection values applied to said deflection yoke.

9. The apparatus according to claim 4 including further apertured electrodes disposed on either side of said first and third electrodes to provide a lensing action with respect to said electron beam in conjunction with said first and third electrodes, said further apertured electrodes and said second electrode each having a substantially constant voltage applied thereto.

10. The apparatus according to claim 9 wherein the apertures in said further electrodes are circular and aligned with said electron beam.

11. The apparatus according to claim 4 wherein said voltage applying means includes means for applying a correction voltage to said focus electrode, said correction voltage focusing said beam at the plurality of predetermined locations on the screen of said cathode-ray-tube.

12. The apparatus according to claim 11 wherein said means for applying the correction voltage to said focus electrode comprises means addressable in accordance with said beam deflection signals for storing values representing the voltages appropriate for application to said focus electrode for bringing about focusing of said beam at the corresponding plurality of locations on the screen of said cathode-ray-tube.

13. The apparatus according to claim 11 wherein said cathode-ray-tube includes an anode electrode, said first and third electrodes being located between said anode electrode and said focus electrode.

14. Astigmatism correction apparatus for an electromagnetically deflected cathode-ray-tube having an electron gun including beam-forming, accelerator and focusing electrodes forming an electron beam and an electromagnetic deflection yoke deflecting said electron beam across a screen of said cathode-ray-tube in response to beam deflection signals applied to said electromagnetic deflection yoke, and wherein said magnetic deflection yoke produces distortion of said electron beam, said apparatus comprising:

electrostatic correction means disposed along said electron beam and through which said electron beam passes before reaching said deflection yoke, said electrostatic correction means comprising at least first, second and third plate-form electrodes spaced along the direction of the electron beam and each having an aperture through which said beam passes, the aperture in the first electrode being non-circular and being elongated in a first direction, the aperture in the third electrode being non-circular and being elongated in a direction that is oblique to said first direction, and the aperture in the second electrode, which is disposed between the first and third electrodes, being circular, and means for applying predetermined correction voltages to said plate-form electrodes for counter-distorting said beam in a compensating sense to distortion caused by said deflection yoke at one of a plurality of predetermined locations on the screen of the cathode-ray-tube.

15. The apparatus according to claim 14 wherein said means for applying the correction voltages to said electrodes applies the predetermined correction voltages responsive to the deflection of said electron beam, said non-circular apertures each comprising an elongated slot.

16. Astigmatism correction apparatus for an electromagnetically deflected color cathode-ray-tube having an electron gun structure forming plural electron beams and an electromagnetic deflection yoke deflecting said electron beams across a screen of said cathode-ray-tube in response to beam deflection signals applied to said electromagnetic deflection yoke, said magnetic deflection yoke bringing about convergence of said electron beams, wherein said magnetic deflection yoke produces distortion in one or more of said electron beams, said apparatus comprising:

electrostatic correction means disposed along said one or more of said electron beams formed by said electron gun structure, said one or more of said beams passing through said electrostatic correction means before reaching said deflecting yoke, said electrostatic correction means comprising at least first, second and third plate-form electrode means spaced along the direction of the electron beam and each having apertures through which respective electron beams pass, the apertures in the first electrode means each being non-circular and being elongated in a first direction and the apertures in the third electrode means each being non-circular and being elongated in a direction that is oblique to said first direction and the apertures in the second electrode means, which is disposed between the first and third electrode means, being circular, and means connected to said electrostatic correction means for dynamically determining an electrostatic field produced by said correction means for counter-distorting the beams passing therethrough in a compensating sense to the distortion caused by said deflection yoke at a plurality of locations on the screen of said cathode-ray-tube.

17. The apparatus according to claim 16 wherein said non-circular apertures comprise elongated slots.

18. The apparatus according to claim 16 wherein said electrode means comprise plural electrodes respectively passing different ones of said electron beams, and wherein said means for determining the electrostatic field produced by said correction means comprises means for applying different voltages to said plural electrodes, said voltage applying means being responsive to beam deflection signals at each of said plurality of locations on the screen of said cathode-ray-tube.

19. The apparatus according to claim 16 including further electrode means on either side of said electrostatic correction means to provide lensing with respect to said electron beams.

20. The apparatus according to claim 1, wherein the electrodes of the electron gun include an anode and the electrostatic correction means comprise two additional plate-form electrodes between which the first, second and third electrodes are disposed and each having a circular aperture through which said beam passes, the second electrode and the two additional electrodes all being connected to the anode of the electron gun.

21. The apparatus according to claim 20, wherein the apertures in the first and third electrodes are transversely elongated slots.

22. The apparatus according to claim 1, wherein the aperture in the third electrode is elongated at an angle of approximately 45 degrees from the direction of elongation of the aperture in the first electrode.

23. The apparatus according to claim 2, wherein the electrodes of the electron gun include an anode and the second electrode is connected to the anode, and the apparatus further comprises two additional plate-form electrodes between which the first, second and third electrodes are disposed and each having a circular aperture through which said beam passes, the second electrode and the two additional electrodes all being connected to the anode.

24. The apparatus according to claim 4, wherein the electrodes of the electron gun include an anode and the second electrode is connected to the anode, and the apparatus further comprises two additional plate-form electrodes between which the first, second and third electrodes are disposed and each having a circular aperture through which said beam passes, the second electrode and the two additional electrodes all being connected to the anode.

25. The apparatus according to claim 14, wherein the electrodes of the electron gun include an anode and the second electrode is connected to the anode, and the apparatus further comprises two additional plate-form electrodes between which the first, second and third electrodes are disposed and each having a circular aperture through which said beam passes, the second electrode and the two additional electrodes all being connected to the anode.

26. The apparatus according to claim 16, wherein the electrodes of the electron gun include an anode and the second electrode means is connected to the anode, and the apparatus further comprises two additional plate-form electrode means between which the first, second and third electrode means are disposed and each having circular apertures through which respective electron beams pass, the second electrode means and the two additional electrode means all being connected to the anode.

* * * * *